Nov. 5, 1940. H. LIST 2,220,163
ELECTRIC BRAKE
Filed Nov. 23, 1937
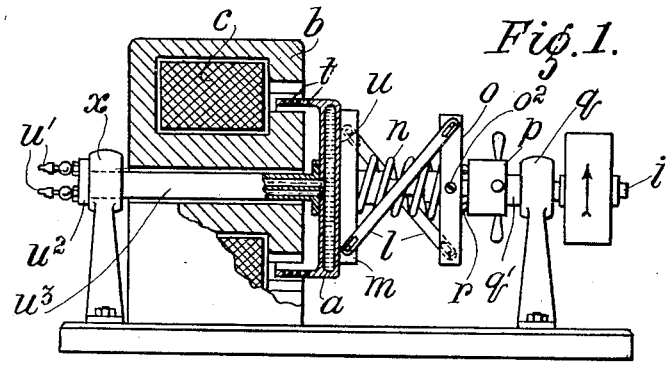
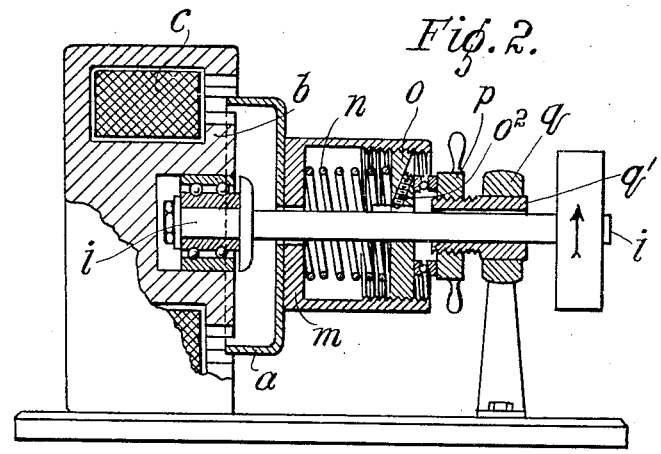
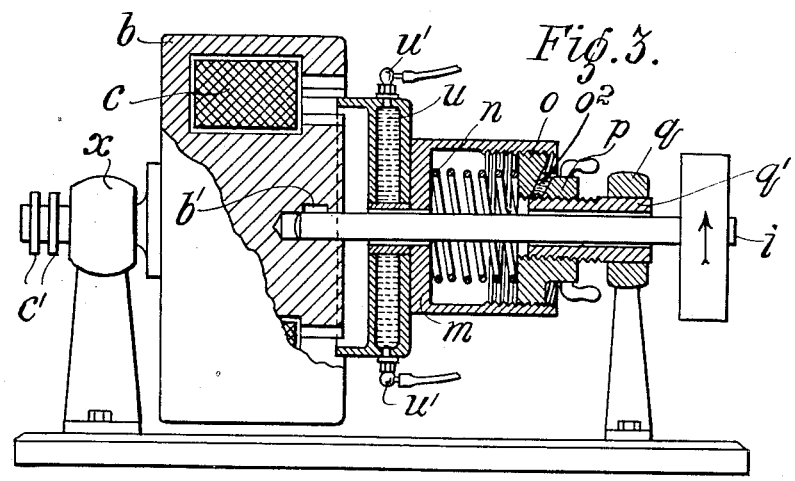

Patented Nov. 5, 1940

2,220,163

UNITED STATES PATENT OFFICE 2,220,163

ELECTRIC BRAKE

Heinrich List, Berlin-Lichterfelde, Germany

Application November 23, 1937, Serial No. 176,085
In Germany March 26, 1935

14 Claims. (Cl. 188—104)

This invention relates to electric brakes of the eddy current type.

An object of the invention is to provide a brake of the type stated which will be adapted for heavy duty such as is imposed upon brakes when used in vehicles or machines.

Another object is to provide a brake of the type stated in use of which the braking effort will be automatically maintained at some determinate relationship with the varying speeds of rotation, for example maintained practically constant notwithstanding that the rotation may vary between low and high speed.

Another object is to provide a brake in use of which a smooth initiation of the brake action can be attained, braking jolts being obviated or minimised so that there will be no need to exercise any particular care in applying the brake.

Another object is to provide a brake having liquid cooling means for dissipating the heat energy produced when the brake is active.

Yet another object is to provide a brake which can be designed dimensionally small, the resultant lightness in weight rendering the brake especially suitable for vehicles.

Other objects of the invention will be apparent from the following description and claims.

Embodiments of the invention will now be described by way of example with reference to the accompanying diagrammatic drawing.

In the drawing, Fig. 1 is a sectional elevation of one embodiment, Figs. 2 and 3 are sectional elevations of modifications of the Fig. 1 embodiment.

Fig. 1 shows a brake including an eddy current cylinder $a$, made of copper, rotatable in an annular air-gap formed in a field magnet $b$, which is made as a pot-magnet with a field winding $c$. The cylinder $a$ is displaceable both turnably and axially upon the shaft $i$ to be braked, this shaft being freely rotatable but axially immovable. The cylinder $a$ is secured to a disc $m$ which is attached by means of links $l$ through ball-and-socket or like universal joints with another disc $o$ on the shaft $i$. The disc $o$ is axially displaceable along the shaft $i$ but is constrained to rotate therewith by the usual feather-and-groove joint (not shown) or other constraining means. The disc $o$, when appropriately adjusted axially of the shaft $i$, is locked thereto, for example by means of a locking screw $o^2$ screwed radially through the disc and engageable with the shaft. There is provided between the discs $m$ and $o$ a spring $n$, and there is provided for adjustment of the initial pressure of the spring $n$, an adjustable screw-ring $p$ on a bearing $q^1$ secured in a block $q$. The ring $p$ acts through the intermediary of a ball-thrust bearing $r$ against the axially displaceable disc $o$. By means of the ring $p$, the setting of the spring pressure can be increased or decreased in accordance with whether it be desired to increase or decrease the magnitude of the setting of the braking action.

Cooling means are preferably provided to dissipate the heat energy produced when the brake is active. As shown diagrammatically, a water-jacket $u$ applied to the cylinder $a$ is supplied with cooling water through conduits $u^1$ leading to and from any suitable source of water supply. The conduits $u^1$ are connected to a distributor $u^2$ on a block $x$ which serves as a bearing for a shaft $u^3$ secured to the jacketed cylinder $a$ and provided with internal ports opening into the jacket.

The shaft $u^3$ is freely slidable through the bearing block $x$, axially to-and-from the extreme left position in which it is shown, by the action of the jacketed cylinder structure $a$, $u$ whenever this structure moves to-and-from the disc $o$. The shaft $u^3$ is formed to abut against the bearing block $x$ which accordingly withstands the thrust due to the adjustable spring $n$ on the cylinder $a$. In the example, it is by virtue of the abutment between block $x$ and shaft $u^3$ that possible adjustment of the spring pressure by ring $p$ is possible.

If now the driving shaft $i$ to be braked rotates in the direction of the arrow and if the eddy current brake is made effective by switching-in the field winding of the pot-magnet, the sudden braking effect acts to cause angular displacement of the loosely mounted disc $m$ in relation to the disc $o$ rotating with, and now axially fixed to the shaft. The attachment of the discs through the links $l$ causes, by reason of the aforesaid angular displacement, an axial displacement of the cylinder $a$, which consequently is retracted from the magnetic field in the air gap against the opposing action of the spring $n$. Ultimately, a state of balance is reached in which the cylinder $a$ is immersed to a certain extent in the magnetic field, the extent of immersion and the corresponding speed being such that the braking action has substantially the magnitude for which the brake is set. As the rotational speed increases, the extent of immersion decreases, so that any increase in the electro-magnetic action due to increase of speed is neutralised by decrease in the area of the cylinder subjected to the electro-magnetic action. That is to say, the extent of immersion, or depth of entry, of the cylinder $a$ in the magnetic field in the gap is inversely proportional to the rotational speed, and the proportionality may be such that throughout the effective speed range of the shaft $i$, the braking effect is practically constant. By virtue of the links $l$, there exists between the extent of immersion of the cylinder in the magnetic field and the torque due to the braking effort a relationship which varies in accordance with a definite characteristic graph or curve.

When the field winding $c$ is deenergized to relieve the brake action, the spring $n$ and the links $l$ automatically force the disc $m$ to restore the jacketed cylinder structure $a, u$ to its initial axial relationship with the magnet $b$.

If, instead of the link attachment illustrated, there is provided a screw device to effect relative axial displacement between the discs $m$ and $o$ whenever relative angular displacement between them occurs, the relationship between braking effect and rotational speed can be adjusted with exactitude to one having a straight line characteristic. A suitable screw device is illustrated by Fig. 2. As therein shown, the disc $o$ is feathered at $o^1$ and axially secured by a screw $o^2$ to the rotatable but axially immovable shaft $i$ and is screw-threaded in a sleeve $m^1$ constituting an extension of the disc $m$, the screw-threads being very steeply inclined. The connection at $o^1$, on temporary withdrawal of the screw $o^2$, permits the disc $o$ to be slidably adjusted along the shaft $i$ but prevents rotation between the disc and shaft. In operation, the disc $o$ will tend to turn in the sleeve $m^1$ and therefore screw itself axially towards the cylinder $a$, but the spring $a$ will oppose the axial movement with an initial force dependent upon the setting of the ring $p$.

When the field winding $c$ is de-energized, the spring $n$ automatically forces the screwed cylinder $m$ to turn back relatively to the disc $o$ and thus restore the cylinder $a$ to its initial axial relationship with the magnet $b$.

If desired, the construction according to Fig. 1 or 2 could be so modified that it is the magnet $b$ which is rotatable, and such an arrangement is illustrated by Fig. 3. In this arrangement, the magnet structure is journalled in a bearing $x$ so as to be freely rotatable but axially immovable, and electric current is supplied to the winding $c$ through slip rings $c^1$ on the rotary structure. The magnet $b$ is keyed at $b^1$ to the shaft $i$ to be braked, so that the magnet structure is driven by said shaft. The disc $o$ is integral with (or rigidly secured to) the adjustable screw-ring $p$ on the stationary bearing $q^1$ and the screw-ring is securable in its position of adjustment on the bearing by a screw $o^2$. Thus, the disc $m$ and cylinder $a$ thereto attached constitute a unit which is normally stationary but which is forced to turn angularly under the influence of the rotating magnet field whenever the magnet is energised to produce the brake-effort, the angular turning motion continuing until a state of equilibrium between the spring action and the magnetic-coupling action is reached.

When the field winding $c$ is deenergized, the spring $n$ automatically forces the screwed cylinder $m$ to turn back on the stationary disc $o$ and thus restore the cylinder $a$ to its initial axial relationship with the magnet $b$.

In such an arrangement also, it is practicable to provide the eddy current cylinder with a water-cooling system. Such a water-cooling system has been illustrated for convenience in Fig. 3. As shown, a water jacket $u$ applied to the cylinder $a$ is supplied with cooling water through flexible tubes $u'$ leading to and from any suitable source of supply.

In any of the examples hereinbefore described embodying the invention in order to increase the effectiveness of the eddy current brake, the eddy-current body can be provided with magnetism-conducting material arranged in the direction of the magnetic lines of the field so as to reduce the high magnetic resistance of the gap; and such material may consist of small irregularly distributed iron pins $t$ (see Fig. 1).

In a brake according to the invention when utilized as a brake in testing appliances, the magnetic field being rotary and the eddy current element suitably held against rotation, the effective turning moment serves as a measure of the work done.

I claim:

1. A heavy-duty electric brake comprising relatively rotatable elements which are magnetically coupled, one of said elements comprising a pot-magnet formed with an annular gap in which a magnetic field is produced and the other being an eddy-current cylinder axially registering with said gap, a rotary member to which one of said elements is operatively connected, means imposing a load on one of said elements and urging the cylinder element to move fully into said gap, and means movable under the influence of the rotational speed of said member, said movable means acting in opposition to the urging action of said load-imposing means.

2. A heavy-duty electric brake comprising a pot-magnet element, which is formed with an annular gap, a cylinder element rotatable in said gap to cause the production of eddy current in said cylinder element, a rotary member, means operatively connecting the cylinder element to said rotary member, said means being adapted to permit angular displacement and enforce simultaneous axial displacement of the cylinder element relatively to the rotary member under the influence of increased rotational speed in order to withdraw said cylinder element in the axial direction away from said gap, and a spring imposing on said cylinder element a load opposing axial withdrawal thereof under the enforcement of said operatively connecting means.

3. A heavy-duty electric brake comprising relatively rotatable elements which are magnetically coupled, one of said elements being an eddy-current annular element and the other being a magnet element formed with an annular gap wherein is produced a magnetic field whose lines of force pass radially through the eddy-current annular element, a rotary member to which one of said elements is operatively connected, means tending to move responsively to the rotational speed of said member in order to automatically maintain a determinate relationship between the braking effect of one element on the other and said rotational speed, and magnetism-conducting material inserted in said eddy-current annular element and arranged approximately in the direction of said lines of force.

4. A heavy-duty electric brake as claimed in claim 3, in which the magnetism-conducting material consists of iron pins penetrating the eddy-current annular element and irregularly arranged therein.

5. A heavy-duty electric brake comprising a stationary electro-magnetic element which has an annular gap and which when energised produces a magnetic field in said gap, an eddy-current element which is rotatably mounted and extend axially into said gap so that there can be produced between said elements a magnetic coupling exercising a braking effect on the eddy-current element, a rotary member to which the eddy-current element is operatively connected in order to brake said member, the arrangement being such that the eddy-current element is axially displaceable in relation to the electro-magnetic element and also such that under the combined influences of the magnetic coupling and the rotational speed of the eddy-current element the latter tends to move axially and reduce the strength of the magnetic coupling by reducing the depth of entry of said eddy-current element in said gap, and means yieldingly opposing axial displacement of the eddy-current element in order to automatically maintain a determinate relationship between the braking effect and the rotational speed.

6. A heavy-duty electric brake comprising the combination of parts defined in claim 5, in which the eddy-current element is arcuate in form to be axially displaceable to a variable extent into the annular gap, and the operative connection between the eddy-current element and the rotary member is such that the eddy-current element is both axially slidable along said member and turnable relatively thereto.

7. A heavy-duty electric brake comprising an electro-magnetic element which when energised produces an annular magnetic field, an eddy-current arcuate element which enters said field, said elements being relatively rotatable so that there can be produced between them a magnetic coupling exercising a braking effect, a rotary member to which one of said elements is operatively connected in order to brake said member, the arrangement being such that the eddy-current element is axially displaceable in relation to the electro-magnetic element and also such that under the combined influences of the magnetic coupling and the rotational speed the eddy-current element tends to move axially and reduce the strength of the magnetic coupling by reducing the extent of entry of the eddy-current element in the magnetic field, and means yieldingly opposing axial displacement of the eddy-current element in order to automatically maintain a determinate relationship between the braking effect and the rotational speed.

8. A heavy-duty electric brake comprising the combination of parts defined in claim 7, in which the electro-magnetic element has an annular field-accommodating gap entered by the eddy-current element, there being an operative connection between the eddy-current element and the rotary member such that the eddy-current element is both axially slidable along said member and turnable relatively thereto.

9. A heavy-duty electric brake comprising relatively rotatable elements which are magnetically coupled so that one can exercise a braking effect on the other, one of said elements being a pot-magnet formed with an annular gap wherein is produced a magnetic field and the other being an annular eddy-current element which axially enters said gap, means subjected to the combined influences of the relative rotational speed and of the magnetic coupling, said means acting under said influences to reduce the effectiveness of the magnetic coupling, a rotary member to which one of said elements is operatively connected in order to brake said member, and adjustable spring means acting on the first-mentioned means in opposition to said combined influences in order to automatically maintain a determinate relationship between the braking effect and rotational speed.

10. A heavy-duty electric brake comprising relatively rotatable elements which are magnetically coupled so that one can exercise a braking effect on the other, one of said elements having an annular gap in which is produced a magnetic field and the other being an eddy current element which axially enters said gap, a rotary member to which one of said elements is operatively connected, means tending to move responsively to the combined effects of the relative rotational speed and of the magnetic coupling when the magnetic-field-producing element is energised, means opposing movement of the first-mentioned means in order to automatically maintain a determinate relationship between the braking effect and the relative rotational speed, and a liquid cooler applied to the eddy current element in order to dissipate heat energy generated therein by the braking effect.

11. A heavy-duty electric brake comprising a frame member, a working member mounted on said frame member to rotate about an axis and with an effective rotational speed range variable between a low speed and a high speed, an electromagnet element having an annular gap in which is produced a magnetic field, an electricity-conducting annular element which axially enters said gap so as to be magnetically coupled to the first-mentioned element to produce an eddy-current braking effect, one of said elements being mounted on said working member to rotate therewith and the other being mounted on the frame member, and one of said elements being displaceable axially of said working member to vary the depth of entry of the annular element in the gap, yieldable means urging the axially displaceable element to adopt a position giving maximum entry, and means connecting the last-mentioned element to that one of said members whereon it is mounted and acting, on variation of the rotational speed of the working member, to displace the last-mentioned element axially in order to vary the depth of entry of the annular element in the gap in such inverse proportion to the rotational speed that any substantial change in the braking effort throughout the effective speed range is prevented.

12. A heavy-duty electric brake comprising a frame member, a working member mounted on said frame member to rotate about an axis and with an effective rotational speed range variable between a low speed and a high speed, an electromagnetic element mounted stationarily on said frame member and formed with an annular gap in which is produced a magnetic field, an electricity-conducting element which axially enters said gap so as to be magnetically coupled to the first-mentioned element to produce an eddy-current braking effect, said electricity-conducting element being mounted on said working member and being displaceable axially thereof to vary the depth of entry of the electricity-conducting element in the gap, yieldable means urging the electricity-conducting element to adopt an axial position giving maximum entry, and inclined links connecting the electricity-conducting element to the working member and constraining the electricity-conducting element to rotate with the working member, and said links acting, on increase of the rotational speed of the working member, to displace the electricity-conducting element axially in order to decrease the depth of entry thereof in the gap.

13. A heavy-duty electric brake comprising a shaft mounted to rotate about its axis and with an effective rotational speed range variable between a low speed and a high speed, a stationarily mounted electro-magnetic element having an annular gap in which is produced a magnetic field, an electricity-conducting annular element which axially enters said gap so as to be magnetically coupled to the first-mentioned element to produce an eddy-current braking effect, said annular element being mounted on said shaft and being displaceable axially thereof to vary the depth of entry of the annular element in the gap, yieldable means urging the annular element to adopt an axial position giving maximum entry, and screw means connecting the annular element to the shaft and co-operating with said yieldable means to constrain the annular element to rotate with the shaft and to move axially in order to vary the depth of entry of the annular element in the gap.

14. A heavy-duty electric brake comprising a working member mounted to rotate about an axis and with an effective rotational speed range variable between a low speed and a high speed, an electro-magnetic element secured to said working member to rotate therewith and formed with an annular gap in which is produced a magnetic field, an electricity-conducting element which axially enters said gap so as to be magnetically coupled to the first-mentioned element to produce an eddy-current braking effect, screw means on which said electricity-conducting element is mounted so as to be displaceable rotationally and axially to vary the depth of entry of the electricity-conducting element in the gap, and yieldable means co-operating with said screw means and urging the electricity-conducting element to adopt an axial position giving maximum entry, the co-operation between the screw means and the yieldable means being such that, on variation of the rotational speed of the working member, inverse variation of the depth of entry of the electricity-conducting element in the gap is effected.

HEINRICH LIST.